US007592566B2

(12) United States Patent
Maura et al.

(10) Patent No.: US 7,592,566 B2
(45) Date of Patent: Sep. 22, 2009

(54) METHOD FOR WELDING CONTACT PLATES AND CONTACT ELEMENTS OBTAINED WITH THE METHOD

(75) Inventors: Massimo Maura, Ceccano (IT); Federico Gamba, Bergamo (IT)

(73) Assignee: ABB S.p.A., Milan (IT)

( * ) Notice: Subject to any disclaimer, the term of this patent is extended or adjusted under 35 U.S.C. 154(b) by 0 days.

(21) Appl. No.: 10/500,366

(22) PCT Filed: Dec. 10, 2002

(86) PCT No.: PCT/EP02/14403

§ 371 (c)(1), (2), (4) Date: Jun. 28, 2004

(87) PCT Pub. No.: WO03/056589

PCT Pub. Date: Jul. 10, 2003

(65) Prior Publication Data

US 2005/0006356 A1 Jan. 13, 2005

(30) Foreign Application Priority Data

Dec. 28, 2001 (IT) .......................... MI2001A2837

(51) Int. Cl.
*B23K 26/02* (2006.01)

(52) U.S. Cl. ............................ 219/121.64; 219/121.78; 219/121.82; 29/874; 29/879; 439/874; 228/262.6

(58) Field of Classification Search ............ 219/121.63, 219/121.64, 121.78, 121.82, 121.85; 228/263.5, 228/263.6, 263, 262.5, 262.6; 439/874; 29/874, 29/879

See application file for complete search history.

(56) References Cited

U.S. PATENT DOCUMENTS 3,579,261 A * 5/1971 Wacker ...................... 219/154
3,614,375 A * 10/1971 Becker .................... 219/91.21

(Continued)

FOREIGN PATENT DOCUMENTS

DE 1926093 * 12/1969

(Continued)

OTHER PUBLICATIONS

"Welding Skills and Practices", American Technical Society, Chapter 7, pp. 75-84, copyright 1971.*

(Continued)

*Primary Examiner*—Samuel M Heinrich
(74) *Attorney, Agent, or Firm*—Connolly Bove Lodge & Hutz LLP

(57) ABSTRACT

A method for mutually welding a plate that has at least one layer based on Ag alloys and a copper body, comprising the use of laser means for performing the welding, its particularity consisting of the fact that it comprises the steps that consist in:—superimposing and coupling one face of the plate on a surface of the copper body;—starting the welding process by focusing the laser means on a point located proximate to the joint between the face of the plate and the surface of the copper body;—maintaining an angle of incidence of the laser means at values other than 0° with respect to the perpendicular to the surface to be welded;—moving the laser means with respect to the joint, so that the weldpool is pushed along the joint.

14 Claims, 1 Drawing Sheet

U.S. PATENT DOCUMENTS

| | | | | | |
|---|---|---|---|---|---|
| 3,629,746 | A | * | 12/1971 | De Lucia | 335/170 |
| 3,667,110 | A | * | 6/1972 | Gwyn, Jr. | 228/193 |
| 3,818,403 | A | * | 6/1974 | Ambler | 337/85 |
| 3,859,491 | A | * | 1/1975 | Larson | 200/266 |
| 4,224,499 | A | * | 9/1980 | Jones | 219/121.85 |
| 4,230,930 | A | * | 10/1980 | Chang et al. | 219/121.64 |
| 4,270,496 | A | * | 6/1981 | Narasimhan et al. | 123/90.51 |
| 4,291,215 | A | * | 9/1981 | Bennett et al. | 219/118 |
| 4,464,231 | A | * | 8/1984 | Little | 205/73 |
| 4,514,025 | A | * | 4/1985 | Maulandi | 439/246 |
| 4,715,524 | A | * | 12/1987 | Fukaya et al. | 228/165 |
| 5,155,323 | A | * | 10/1992 | Macken | 219/121.64 |
| 5,268,555 | A | * | 12/1993 | Solero et al. | 219/121.63 |
| 5,591,359 | A | * | 1/1997 | Saitou et al. | 219/121.64 |
| 5,595,670 | A | * | 1/1997 | Mombo-Caristan | 219/121.64 |
| 5,980,335 | A | * | 11/1999 | Barbieri et al. | 439/824 |
| 6,060,882 | A | * | 5/2000 | Doty | 324/318 |
| 6,143,998 | A | * | 11/2000 | Mattes | 200/275 |
| 6,163,011 | A | * | 12/2000 | Urushizaki et al. | 219/121.64 |
| 6,185,852 | B1 | * | 2/2001 | Whalen et al. | 42/70.11 |
| 6,770,840 | B2 | * | 8/2004 | Minamida et al. | 219/121.64 |
| 2004/0099493 | A1 | * | 5/2004 | Himmelsbach et al. | 188/250 B |

FOREIGN PATENT DOCUMENTS

| | | | | |
|---|---|---|---|---|
| DE | 196 30 533 | A1 | | 2/1998 |
| EP | 0 288 585 | | | 11/1988 |
| EP | 000698442 | A2 | * | 2/1996 |
| JP | 81019941 | B | * | 5/1981 |
| JP | 56066394 | A | * | 6/1981 |
| JP | 357160590 | A | * | 10/1982 |
| JP | 06170567 | A | * | 12/1982 |
| JP | 359191577 | A | * | 10/1984 |
| JP | 360166167 | A | * | 8/1985 |
| JP | 62006787 | A | * | 1/1987 |
| JP | 363018647 | A | * | 1/1988 |
| JP | 02179369 | A | * | 7/1990 |
| JP | 403114687 | A | * | 5/1991 |
| JP | 05054925 | A | * | 3/1993 |
| JP | 409139164 | A | * | 5/1997 |
| JP | 410178247 | A | * | 6/1998 |
| JP | 10216959 | A | * | 8/1998 |
| JP | 11054864 | A | * | 2/1999 |
| JP | 2003225764 | A | * | 8/2003 |
| RU | 1803301 | A1 | * | 3/1993 |
| WO | WO9739855 | A1 | * | 10/1997 |

OTHER PUBLICATIONS

Metals Handbook Ninth Edition, “Laser Beam Welding”, pp. 647-671, 1983.*

* cited by examiner

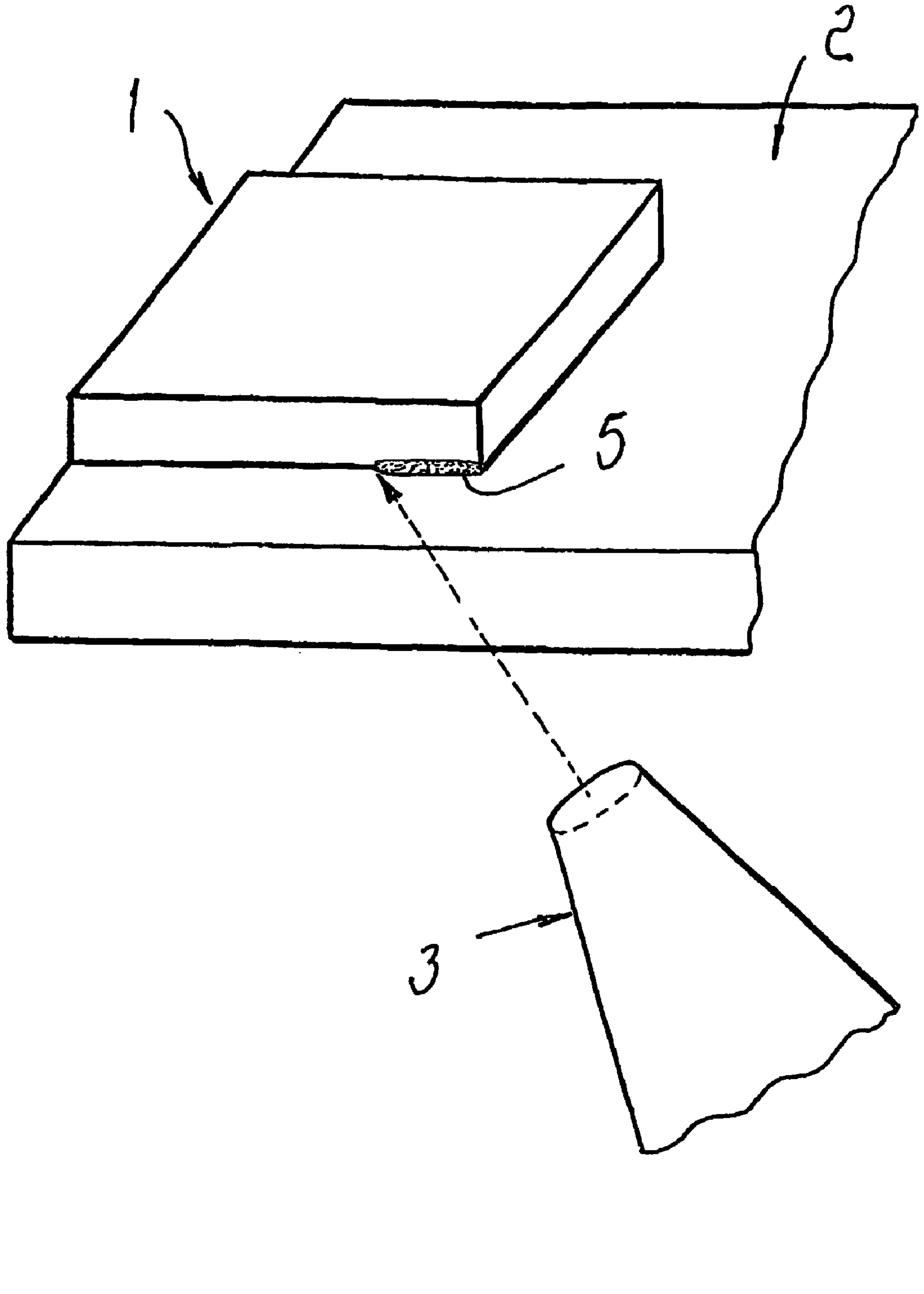
1
2
5
3

METHOD FOR WELDING CONTACT PLATES AND CONTACT ELEMENTS OBTAINED WITH THE METHOD

The present invention relates to a method for welding contact plates, particularly contact plates having at least one layer based on a silver alloy (such as Ag/Mo, Ag/WC or the like) on a copper or copper-based element, particularly on a moving or fixed contact of low-voltage circuit breakers and contactors. The method according to the present invention is based on laser technologies for performing said welding.

Contact plates of circuit breakers and electric contactors, particularly of low-voltage circuit breakers and contactors, are generally fixed to the corresponding contact by using braze welding processes with or without the addition of metal; another fixing process that can be used is direct induction or resistance welding.

Although these methods produce satisfactory results, they have drawbacks, among which mention must certainly be made of the annealing process to which the copper is subjected due to the application of heat caused by the braze welding process. This heating, which can reach temperatures on the order of 700° C. for a few tens of seconds, causes a reduction and degradation of the mechanical characteristics of the copper.

In order to obviate these drawbacks, attempts have been made to find a process that does not produce applications of heat that are harmful for the mechanical characteristics of the parts to be joined. In particular, patent application EP288585 describes a process for welding contact plates based on laser technologies.

According to what is described in said patent application, the material that constitutes the contact plate, which is an alloy of Ag and of a metal oxide, is briefly subjected to fusion at its surface by irradiation with a laser in a reducing environment, preferably hydrogen or a mixture of nitrogen/hydrogen.

In order to reduce reflection phenomena, the surface of the plate is roughened beforehand by brushing or sanding, or is darkened. The laser is then moved so as to cover the entire surface of the plate or so as to trace a grid-like path on it. The contact plates (arranged beforehand on the component onto which they will be welded) are aligned on a conveyor belt that conveys them into a chamber that contains a reducing environment, under a window that is transparent to laser radiation.

This method, which is based on the conduction of heat on the underside of the plate by exposing to laser radiation the entire upper surface, despite being possible in theory, is not applied in practice owing to its complexity.

It is evident, from what has been described above, that in the current art there is the need to have an efficient method for welding contact plates, particularly for welding Ag alloy plates on copper or copper-based surfaces.

The aim of the present invention is to provide a method for welding contact plates that does not require applications of heat that are harmful to the mechanical properties of the components being welded.

Within the scope of this aim, an object of the present invention is to provide a method for welding contact plates that is based on laser technologies and does not require complicated preparation treatments.

Another object of the present invention is to provide a method for welding contact plates, based on laser technologies, that does not entail the use of reducing environments.

Another object of the present invention is to provide a method for welding contact plates, based on laser technologies, that provides stable joints between the components subjected to the welding process.

Another object of the present invention is to provide a method for welding contact plates, based on laser technologies, that can be used in an automated production cycle.

Another object of the present invention is to provide a method for welding contact plates, based on laser technologies, that ensures mass repeatability.

Another object of the present invention is to provide a method for welding contact plates, based on laser technologies, that can be industrialized easily, has modest costs and is economically competitive.

This aim, these objects and others that will become better apparent hereinafter are achieved by means of a method for mutually welding a plate that has at least one layer based on Ag alloys and a copper or copper-based body, wherein said method comprises the use of laser means for performing said welding, characterized in that it comprises the steps that consist in:

- superimposing and coupling one face of said plate on a surface of said copper or copper-based body;
- starting a welding process by focusing the laser means on a point located proximate to the joint between said face of said plate and said surface of said copper or copper-based body;
- maintaining an angle of incidence of said laser means at values other than 0° with respect to the perpendicular to the surface to be welded;
- moving the laser means with respect to the joint, so that the weldpool is pushed along the joint.

It has been found in fact that by using a welding that entails the use of laser means and by acting according to the method of the present invention, a weld is provided between the plate and the copper or copper-based body which does not have the drawbacks of the braze welding methods of the known art and does not require the complicated refinements used in laser welding methods of the known art.

Further characteristics and advantages of the present invention will become better apparent from the following description of a preferred but not exclusive embodiment, illustrated only by way of non-limitative example in the accompanying drawing, wherein the only FIGURE is a schematic view of a system for mutually welding a plate and a copper or copper-based body provided according to the invention.

In the accompanying FIG. 1, the plate having at least one layer based on Ag alloys is designated by the reference numeral 1, while the copper body is designated by the reference numeral 2. As mentioned, the method according to the present invention entails, to perform welding, the use of laser means, shown schematically in FIG. 1 and designated by the reference numeral 3.

In order to provide the weld (designated by the reference numeral 5 in the FIGURE), one face of the plate is superimposed and coupled on a surface of the copper or copper-based body. The welding process is started by focusing the laser means on a point located proximate to the joint between the face of the plate and the surface of the copper body.

In order to avoid or at least minimize reflection phenomena, it is important to keep the angle of incidence of the laser means, during the starting step and during the actual welding process, at values other than 0° with respect to the perpendicular to the surface to be welded. In practice, this means that the laser beam must not be perpendicular to the surface to be welded.

The actual welding process is then performed by moving the laser means with respect to the joint so that the weldpool is pushed along the joint. The "pushed" weldpool condition occurs when a component of the angle of incidence is orientated in the same direction as the relative motion between the laser beam and the welded joint. It has been found that this condition is required in order to allow the weldpool to self-sustain. If one works in "drawn" weldpool conditions (which occur when a component of the angle of incidence is oppositely orientated with respect to the relative motion between the laser beam and the welded joint), it has been found that reflections of the laser beam induced by the plasma increase, generating uncontrolled cycles of quenching and restarting of the molten weldpool, cratering or dangerous returns of the laser beam into the generation system.

It is evident to the person skilled in the art that welding is performed by virtue of a relative movement of the laser means with respect to the components to be welded during the welding operation. This relative movement in practice can be provided by keeping motionless the components to be welded and by moving the laser means, by keeping the laser means motionless and moving the components to be welded, or by moving both.

The advancement speed, the angle of incidence and all the other physical parameters of the laser beam described in greater detail hereinafter can be chosen and modulated according to the characteristics of the elements to be welded, such as for example their chemical nature or their thickness, but can also be controlled and varied appropriately during the welding operations in order to compensate for the heating of the regions and in general to optimize the results.

Preferably, the welding process is started by focusing the laser means on a point of the copper body proximate to the joint between the surface of said copper or copper-based body and the face of said plate.

Differently from what one might expect, it has in fact been found that better results are obtained when starting and welding occur at the copper side of the joint. In particular, it has been found that particularly good results are achieved when at least 70% of the molten material lies, with respect to the joint, on the side that belongs to the copper body. This condition facilitates the manufacturing process and allows to obtain better mechanical strength characteristics, such as tensile strength, than those achieved when working in other manners.

As mentioned, the laser beam must not be perpendicular to the surface to be welded, and the angle of incidence of the laser means and therefore of the corresponding laser beam with respect to the perpendicular to the surface to be welded is between 5 and 20°.

It has been found in practice that it is highly preferable to work with laser means based on solid-state technologies, for example a Nd crystal laser. In this case also, the characteristics of use of the laser, such as for example the frequency, power and angle of incidence, may be chosen and modulated even during welding as a function of the characteristics of the elements to be welded and of the results to be obtained.

In order to obtain better results, it is preferable for the plate to comprise, in addition to a layer based on Ag alloys, also a layer of copper. Said plates can be obtained for example by means of a coextrusion process and constitute a further aspect of the present invention.

By using these plates, the welding process is performed by superimposing and coupling the copper layer of said plate onto the surface of the copper body.

It has been found in practice that the method according to the invention solves the problems of the known art and has many advantages over it, since braze welding techniques and the problems associated therewith are avoided. The combination of characteristics of the method according to the invention furthermore allows to avoid the phenomena of reflection and degradation of the weldpool that are typical of processes based on laser technologies according to the known art.

With the method according to the invention, therefore, it is possible to obtain contact elements that have improved characteristics with respect to the known art. In particular, it is possible to obtain contact elements in which the copper body is constituted by the moving contact or by the fixed contact of a contactor or of a low-voltage circuit breaker.

The contact elements, as well as the contactors or circuit breakers obtained from them and comprising them, constitute another aspect of the present invention.

In practice it has been found that the method according to the invention and the contact elements obtained thereby fully achieve the intended aim and objects. The invention thus conceived is susceptible of numerous modifications and variations, all of which are within the scope of the inventive concept. All the details may furthermore be replaced with other technically equivalent elements.

The invention claimed is:

1. A method for mutually welding a plate comprising at least one layer based on Ag alloys and a copper layer, and a copper body, comprising the use of a laser means for performing said welding, said method comprising:

superimposing and coupling the copper layer of said plate on a surface of said copper body;

starting welding by focusing said laser means on a point located proximate to a joint between one face of said plate and said surface of said copper body;

maintaining an angle of incidence of said laser means at values that are within a range from 5° to 20° with respect to the perpendicular to said surface of said copper body;

moving the laser means with respect to the joint so as to form an elongated weld, a component of the angle of incidence of said laser means being kept oriented along the same direction as the relative motion between said laser and said welded joint, said laser means being pointed towards a direction that is opposite with respect to the portion of said joint that has already been welded, thereby forming an elongated weld having a weld pool that is pushed along said joint to be welded; and maintaining a quantity of molten material of said weld, which lies on a side that belongs to said copper body with respect to said joint, within a range that is equal to or greater than 70%.

2. The method according to claim 1, wherein starting welding occurs by focusing the laser means on a point of the copper body proximate to the joint between the surface of said copper body and the face of said plate.

3. The method according to claim 1, wherein said laser means comprise a solid-state laser.

4. The method according to claim 2, wherein at least 70% of molten material formed by welding lies on a side of the joint that belongs to the copper body.

5. The method according to claim 2, wherein said laser means comprise a solid-state laser.

6. The method according to claim 2, wherein said plate comprises at least one copper layer.

7. A contact element produced by a method for mutually welding a plate comprising at least one layer based on Ag alloys and a copper layer, and a copper body, comprising the use of a laser means for performing said welding, said method comprising:

superimposing and coupling the copper layer of said plate on a surface of said copper body;

starting welding by focusing said laser means on a point located proximate to a joint between one face of said plate and said surface of said copper body;

maintaining an angle of incidence of said laser means at values that are within a range from 5° to 20° with respect to the perpendicular to the surface to be welded; and moving the laser means with respect to the joint so as to form an elongated weld, a component of the angle of incidence of said laser means being kept oriented along the same direction as the relative motion between said laser means and said welded joint, said laser means being pointed towards a direction that is opposite with respect to the portion of said joint that has already been welded, thereby forming an elongated weld having a weld pool that is pushed along said joint to be welded; and maintaining a quantity of molten material of said weld, which lies on a side that belongs to said copper body with respect to said joint, within a range that is equal to or greater than 70%.

8. The contact element according to claim 7, wherein said copper body is the moving contact of a low-voltage contactor or circuit breaker.

9. The contact element according to claim 7, wherein said copper body is the fixed contact of a low-voltage contactor or circuit breaker.

10. A low-voltage circuit breaker comprising one or more contact elements according to claim 8.

11. A low-voltage contactor comprising one or more contact elements according to claim 8.

12. The method according to claim 7, wherein at least 70% of molten material formed by welding lies on a side of the joint that belongs to the copper body.

13. The method according to claim 7, wherein said laser means comprise a solid-state laser.

14. The method according to claim 7, wherein said plate comprises at least one copper layer.

* * * * *